United States Patent
Kim

(10) Patent No.: US 7,489,708 B2
(45) Date of Patent: Feb. 10, 2009

(54) METHOD OF DIVIDING A PAYLOAD INTRA-FRAME

(75) Inventor: Dong-Kyu Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 781 days.

(21) Appl. No.: 10/994,150

(22) Filed: Nov. 19, 2004

(65) Prior Publication Data

US 2005/0111451 A1 May 26, 2005

(30) Foreign Application Priority Data

Nov. 25, 2003 (KR) .................. 10-2003-0084210

(51) Int. Cl.
*H04J 3/16* (2006.01)
(52) U.S. Cl. .................................. 370/470
(58) Field of Classification Search ............... None
See application file for complete search history.

(56) References Cited

U.S. PATENT DOCUMENTS

| 6,172,972 B1 | 1/2001 | Birdwell et al. | |
| 6,771,660 B1 * | 8/2004 | Bourlas et al. | 370/466 |
| 6,928,289 B1 * | 8/2005 | Cho et al. | 370/310.2 |
| 2002/0016852 A1 | 2/2002 | Nishihara | |
| 2003/0169769 A1 * | 9/2003 | Ho et al. | 370/473 |
| 2005/0068895 A1 * | 3/2005 | Stephens et al. | 370/235 |

FOREIGN PATENT DOCUMENTS

| EP | 1 073 228 A1 | 1/2001 |
| EP | 1 414 176 A2 | 4/2004 |
| EP | 1 489 782 A1 | 12/2004 |
| JP | 2004-328173 | 11/2004 |
| KR | 2000-0024790 | 5/2000 |
| KR | 2001-085311 | 9/2001 |

* cited by examiner

*Primary Examiner*—Anh-Vu H Ly
(74) *Attorney, Agent, or Firm*—F. Chau & Associates, LLC

(57) ABSTRACT

Provided is a method of dividing a payload intra-frame for improving throughput of a carrier sensing multiple access/collision avoidance (CSMA/CA) wireless communication network. The payload intra-frame dividing method includes a data frame dividing step and a physical layer frame generating step in which a physical layer receives a plurality of data frames from an upper layer within a range of the maximum data frame length the physical layer can transmit and transmits the data frames as a single physical layer data frame. Furthermore, an acknowledge (ACK) frame is provided, which can minimize the deterioration of throughput even when a data frame, which has been divided into a plurality of data frames and transmitted as a single data frame, is required to be re-transmitted because an error is generated in the data frame.

16 Claims, 5 Drawing Sheets

METHOD OF DIVIDING A PAYLOAD INTRA-FRAME

CROSS-REFERENCE TO RELATED APPLICATION

This application claims priority to Korean Patent Application No. 2003-84210, filed on Nov. 25, 2003, in the Korean Intellectual Property Office, the disclosure of which is incorporated herein in its entirety by reference.

TECHNICAL FIELD

The present invention relates to data communication and, more particularly, to dividing a payload intra-frame in a wireless local area network (LAN).

DISCUSSION OF THE RELATED ART

A small wireless communication cell used to construct a wireless local area network (LAN) includes a plurality of stations (or terminals) and an access point (AP) that connects the plurality of stations to a wired network. Data communication between multiple stations located in a wireless communication cell or between a station placed in a wireless communication cell and a station located in another wireless communication cell is carried out via APs existing in the wireless communication cells. The APs and stations include wireless data transceivers to enable wireless communication therebetween.

While a single wireless communication cell may have a plurality of stations, the stations cannot simultaneously transmit/receive data through a single AP. Accordingly, the stations fix an order for transmitting data in order to avoid collision of data as follows.

A station having data to be transmitted extracts an arbitrary number within a specific range (e.g., 1 through N) and checks whether a transmission channel is used at a predetermined slot time. When the transmission channel is not used, the station subtracts 1 from the extracted number. This procedure is repeated and, when the extracted number becomes zero, the station transmits a data frame through the transmission channel. Because all the stations in the communication cell extract arbitrary numbers, there is a high probability that the stations extract different numbers. Accordingly, the transmission order is naturally fixed. Furthermore, the probability is low that some of the stations will extract the same number, thus collision of transmission data can be prevented (as referred to in the Institute for Electrical and Electronics Engineers (IEEE) 802.11 Standard—part II: Wireless LAN Medium Access Control and Physical Layer specifications). One of the methods used to avoid the collision of transmission data is a wireless data communication method in which a channel is shared through a carrier sensing multiple access/collision avoidance (CSMA/CA) mechanism.

In a CSMA/CA wireless communication cell, transmission/reception of data is carried out by frames. A data transmitter transmits a data frame to a receiver and receives an acknowledge (ACK) frame, which indicates that the data frame has been normally transmitted to the receiver from the transmitter. The data transmitter can transmit a next data frame only when it receives the ACK frame from the receiver.

A data frame is generally composed of a preamble, a header and a payload. The preamble is a specific pattern previously arranged between a transmitter and a receiver and located at the head of the data frame. The receiver detects a frame using the current channel, detects the head of the detected frame, synchronizes with the transmitter, and presumes the effect of channel distortion on a received signal using the preamble.

The header is defined differently in a physical layer and a media access control (MAC) layer, which will be explained later. The header of the MAC layer includes MAC addresses (for transmission and reception) and control information. A wireless LAN judges whether the destination of a received frame is the wireless LAN using the information provided in the header. The header of the physical layer includes information such as a length of a payload in the physical layer and a transmission rate. The payload is data transmitted by a station and it is modulated according to a predetermined protocol in a modem.

FIG. 1 shows a protocol between an Ethernet and a wireless LAN. Referring to FIG. 1, a length of a data frame that can be processed when the data frame is transmitted from an upper layer to a lower layer is illustrated. The wireless LAN is connected to the Ethernet and includes a MAC layer (IEEE 802.11a) and physical layer (IEEE 802.11a).

The MAC layer of the wireless LAN defines an Ethernet frame 100 (IEEE 802.3 MAC) received through the Ethernet as a MAC service data unit (MSDU) 110. The MSDU 110 is used for generating a MAC protocol data unit (MPDU) 120 in the MAC layer. The MPDU 120 is composed of the MSDU 110, a MAC header and a frame check sequence (FCS). Here, the FCS has a value of an IEEE 32-bit cyclic redundancy code (CRC) in a MAC layer frame and is used for checking whether the MAC layer frame has an error or not. The physical layer receives the MPDU 120 from the MAC layer and defines it as a physical service data unit (PSDU) 130. The physical layer converts the PSDU 130 to a payload according to a method provided by the IEEE 802.11a international standard, adds a physical layer convergence protocol ((PLCP) preamble) and a header (SIGNAL field) to the payload to generate a physical layer frame 140 and transmits the physical layer frame 140 to a physical medium. The physical layer is composed of a physical medium dependent (PMD) and PLCP sublayer. The PMD sublayer includes antenna and radio frequency (RF) modem functions. The PLCP sublayer converts a frame format between the MAC layer and PMD sublayer.

Referring to FIG. 1, the maximum length of the Ethernet frame 100 is 1526 oct and the maximum length of the MSDU 110 available in the MAC layer is 2312 oct. Here, oct means 8 bits. Thus, the MAC layer can receive the Ethernet frame 100 from the Ethernet. Furthermore, the maximum length of the MPDU 120 generated in the MAC layer is 2346 oct (maximum MSDU 2312 oct+MAC header 30 oct+FCS 4 oct) and the maximum PSDU 130 in the physical layer is 4095 oct. Thus, the physical layer can receive the data frame from the MAC layer.

Current wireless LANs connected to the Ethernet do not use the entire frame length provided by, for example, the IEEE 802.11a standard because the MSDU 110 having a maximum of 1526 oct is processed for a single transmission. For example, if the MSDU 110 is 1526, the MPDU 120 or PSDU 130 becomes 1560 oct (1526 oct+34 oct), thus approximately 38% of the maximum PSDU's 130 length in the physical layer is used. Therefore, the length of a frame actually transmitted becomes the basis of a calculation for throughput that is the actual transmission rate of the MAC layer.

FIG. 2 shows a timing scheme for transmitting and receiving frames in the wireless LAN according to the IEEE 802.11a standard. In addition, FIG. 2 shows a procedure for exchanging frames and transmitting data in the physical layer between an AP and a station according to the IEEE 802.11a standard.

A busy medium 200 indicates that a receiver is receiving data from a transmitter. During a back-off 210, after a lapse of a predetermined period of time from the time when the receiver stops receiving data from the transmitter, another transmitter extracts an arbitrary value and checks whether a channel is used at a predetermined slot time, as described above with reference to FIG. 1. Accordingly, the receiver waits the slot time corresponding to the extracted value.

A data frame 220 is data that is transmitted to the receiver when its turn comes up during the back-off 210. The data frame 220 includes data received from the MAC layer of the transmitter. An ACK frame 230 is transmitted from the receiver to the transmitter. The transmitter can transmit the next data frame only when it receives the ACK frame.

A distributed inter-frame space DIFS is a frame interval between the time when transmission of data between the receiver and transmitter is finished and the start of the back-off 210. During the DIFS, another transmitter waits its turn in order to transmit a data frame through the transmission channel. A short inter-frame space SIFS is an interval between the data frame 220 and ACK frame 230, which is the shortest frame interval.

FIG. 3 is a graph showing the relationship between the throughput and MSDU length of the wireless LAN according to the IEEE 802.11a standard. Referring to FIG. 3, the throughput increases as the length of the data frame of the MAC layer received from an upper layer increases. In the Ethernet, if the physical layer transmits data at, for example, 54 Mbps, the throughput having a maximum of 32 Mbps can be secured when the MSDU is 1560 oct. When the MSDU is increased to approximately 4000 oct, the throughput having a maximum of 42 Mbps can be secured.

The aforementioned throughput is the maximum value when the data frame has been normally transmitted, for example, without an error. If an error is detected in the transmitted data frame, the transmitter should re-transmit the data frame. In this case, the throughput is decreased. Accordingly, when the frame length is increased to improve throughput, the throughput may be deteriorated when the data frame has an error.

SUMMARY OF THE INVENTION

The present invention provides a method of dividing a payload intra-frame in which a physical layer receives a plurality of data frames from an upper layer within a range of the maximum data frame length the physical layer can transmit and transmits the received data frames as a single physical layer data frame, to thereby improve network throughput.

The present invention also provides a method of dividing a payload intra-frame in which a physical layer receives a data frame from an upper layer within a range of the maximum data frame length the physical layer can transmit, divides the data frame into a plurality of data frames, and transmits the divided data frames as a single data frame, to thereby improve network throughput.

The present invention also provides a method of dividing a payload intra-frame, which is capable of minimizing the deterioration of throughput even when a data frame, which has been divided into a plurality of data frames and transmitted as a single data frame, is required to be re-transmitted because an error is generated in the data frame.

According to an aspect of the present invention, there is provided a method of dividing a payload intra-frame to generate a data frame transmitted among a media access control (MAC) layer, a physical layer and a physical medium that construct a wireless local area network (LAN). The method comprises a step in which the MAC layer receives a predetermined number of data frames from an upper layer and allocates a MAC layer header and a cyclic redundancy code (CRC) to the data frames to divide the data frames based on the number of the data frames; and a step in which the physical layer generates a physical layer data frame, which is divided into the predetermined number of data frames, using the divided data frames from the MAC layer, a preamble and a physical layer header. The predetermined number is decided by a ratio of the number of data frames received from the upper layer to the number of data frames that the MAC layer can receive.

The method further comprises: a step in which a receiver that received one of the number of data frames from a transmitter sends an acknowledge (ACK) frame to the transmitter, the ACK frame includes data that indicates that an error is generated in the physical layer data frame while the physical layer data frame is transmitted.

The dividing step comprises: a step in which the MAC layer adds the MAC layer header to the data frames received from the upper layer and divides the data frames having the MAC layer header into the predetermined number of data frames; and a step of adding the CRC to each of the divided data frames and generating a data frame including a predetermined number of inner frames each of which is composed of the CRC and each of the divided data frames.

The physical layer data frame generating step comprises: a step in which the physical layer receives the data frame including the predetermined number of inner frames from the MAC layer and respectively processes the inner frames using an Institute for Electrical and Electronics Engineers (IEEE) 802.11 standard to generate a predetermined number of sub payloads; a step of adding a partial preamble and a physical layer header to each of the sub payloads other than the first sub payload to generate a payload; and a step of generating the physical layer data frame using a preamble, a header and the generated payload.

The physical layer data frame includes a predetermined number of sub physical layer frame groups each of which is composed of a preamble, a header and a payload, wherein the first header in the sub physical layer frame groups represents a length of data frames following the first header, the second header represents a length of data frames following the second header, and the third header represents a length of data frames following the third header.

According to another aspect of the present invention, there is provided a method of dividing a payload intra-frame to generate a data frame transmitted among a MAC layer, a physical layer and a physical medium that construct a wireless LAN. The method comprises a step in which the MAC layer divides a data frame received from an upper layer into a plurality of data frames and allocates a MAC layer header and a CRC to each of the divided data frames; and a step in which the physical layer generates a physical layer data frame, which is divided into as many data frames that the physical layer can transmit, using the divided data frames from the MAC layer, a preamble and a physical layer header.

According to yet another aspect of the present invention, a method of dividing a payload intra-frame to generate a physical layer data frame, comprises: (a) defining a first data frame received from a first upper layer as a media access control service data unit (MSDU); (b) adding a MAC header to the MSDU to generate a second data frame; (c) dividing the second data frame into a plurality of second data frames; (d)

adding CRC check bits to the plurality of second data frames; (e) defining the plurality of second data frames including the CRC check bits into a plurality of second groups; (f) defining the plurality of second groups received from a second upper layer as a plurality of physical service data units (PSDUs); (g) processing the plurality of PSDUs to generate a plurality of payloads corresponding to the plurality of PSDUs; (h) adding a first preamble, and a first header to the plurality of payloads corresponding to the plurality of PSDUs except the first payload of the plurality of payloads corresponding to the plurality of PSDUs to generate a plurality of sub-payload groups; and (i) adding a second preamble and a second header to the plurality of sub-payload groups to generate a physical layer data frame.

Steps (a-e) take place in a MAC layer. Steps (f-i) take place in a physical layer. The first upper layer is the Ethernet. The second upper layer is the MAC layer. Step (g) uses the IEEE 802.11 standard for processing the plurality of PSDUs to generate a plurality of payloads corresponding to the plurality of PSDUs. The first data frame is transmitted through a wireless LAN. The wireless LAN is a carrier sensing multiple access/collision avoidance (CSMA/CA) LAN.

BRIEF DESCRIPTION OF THE DRAWINGS

The above and other features of the present invention will become more apparent by describing in detail exemplary embodiments thereof with reference to the attached drawings, in which.

DETAILED DESCRIPTION OF EXEMPLARY EMBODIMENTS

Figure 1:
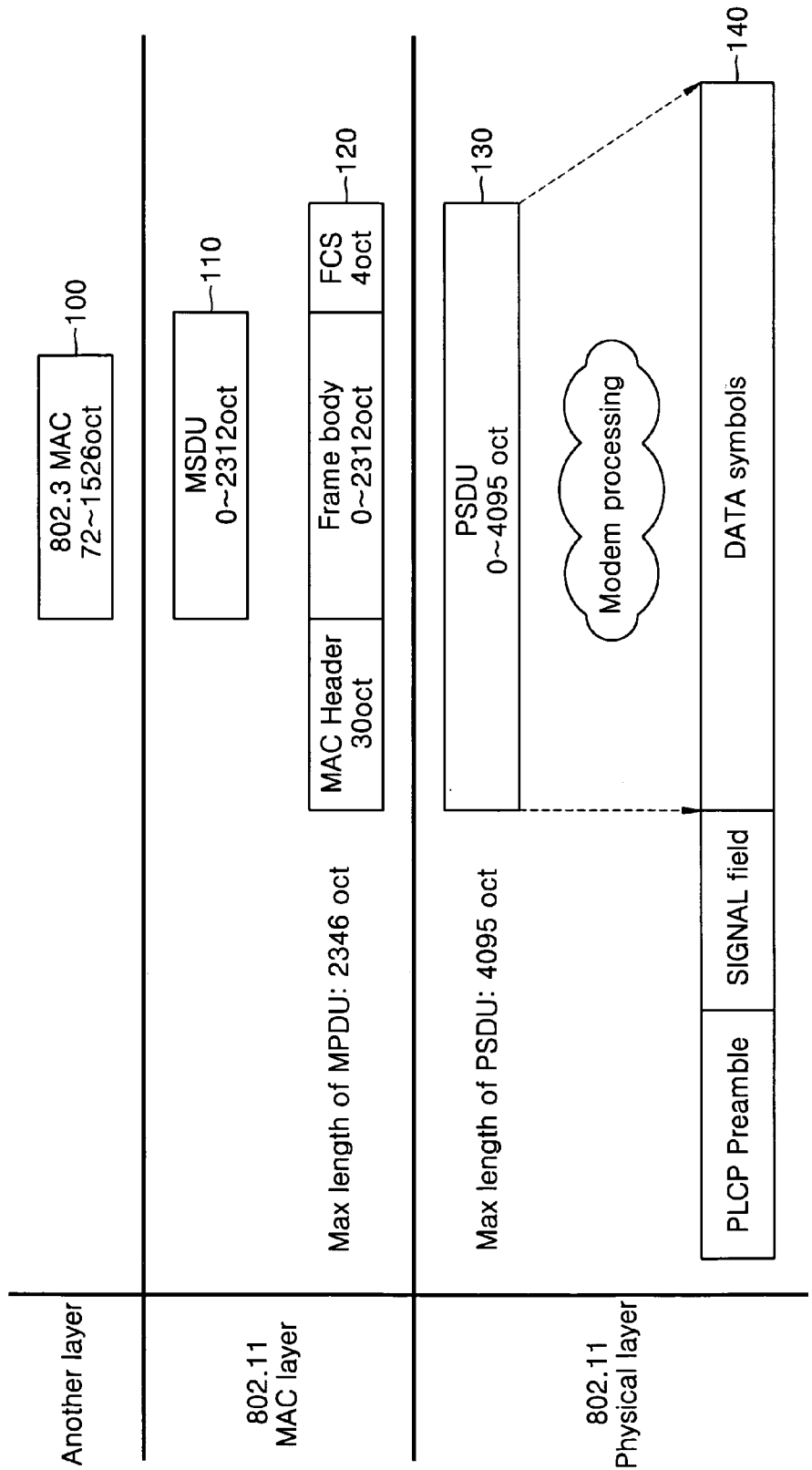
FIG. 1 shows a protocol provided between an Ethernet and a wireless local area network (LAN)
Figure 2:
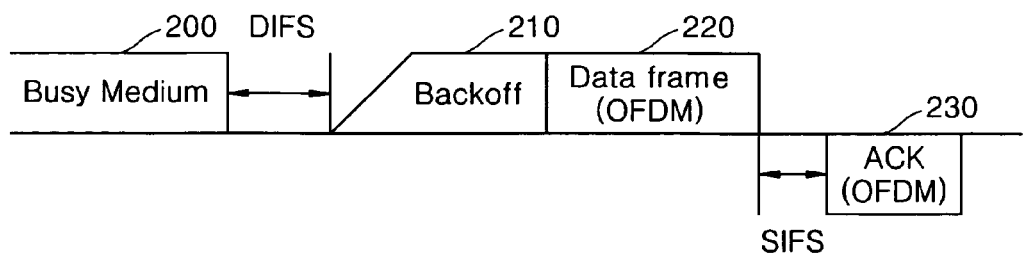
FIG. 2 shows a timing scheme for transmitting and receiving a data frame in the wireless LAN.
Figure 3:
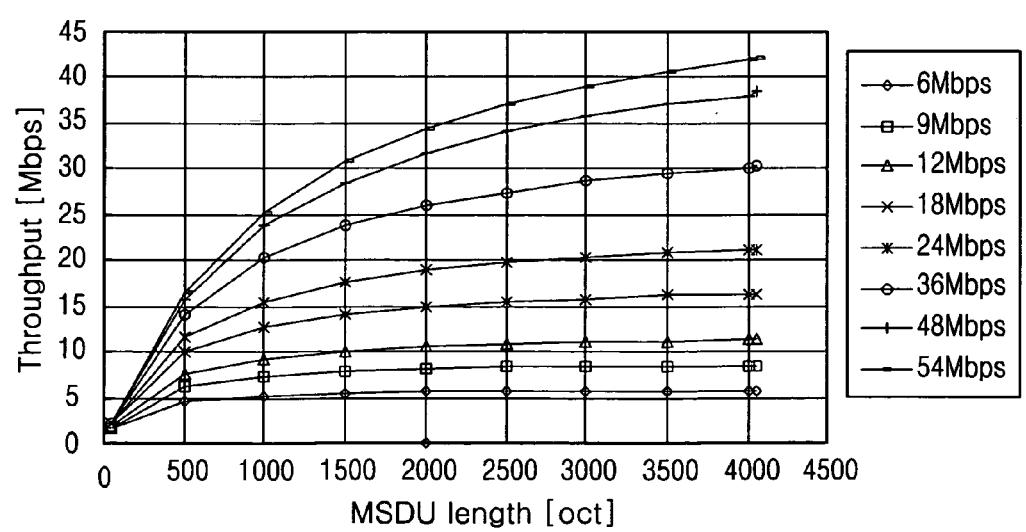
FIG. 3 is a graph showing the relationship between throughput and a media access control service data unit (MSDU) length of the wireless LAN.
Figure 4:
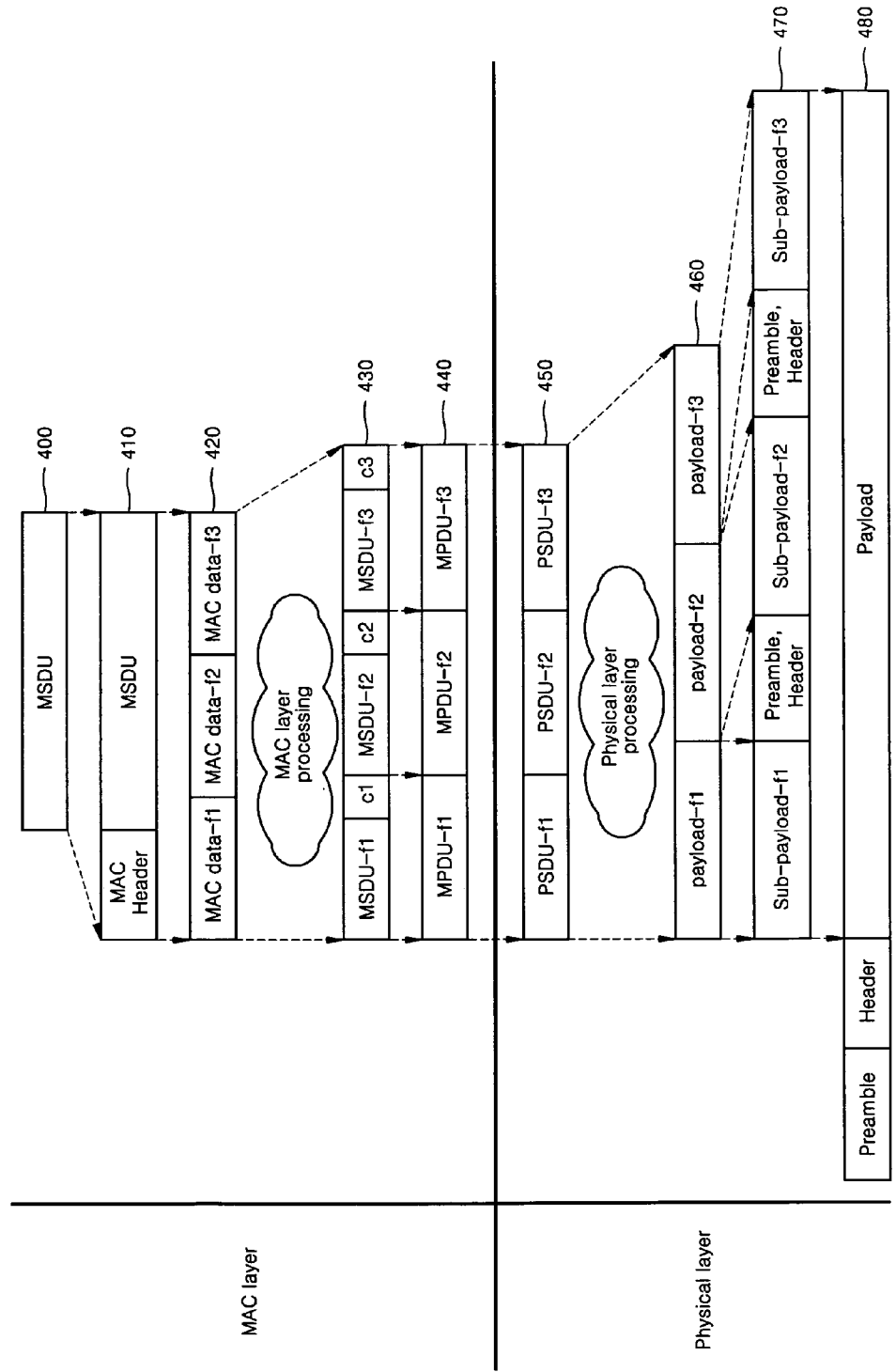
FIG. 4 shows a method of dividing a payload intra-frame according to an exemplary embodiment of the present invention.

FIG. 4 shows a method of dividing a payload intra-frame according to an exemplary embodiment of the present invention. Referring to FIG. 4, the method of dividing a payload intra-frame includes a data frame dividing process in a media access control (MAC) layer and a data frame dividing process in a physical layer.

The data frame dividing process in the MAC layer includes a step 400 of defining a data frame received from an upper layer (e.g., an Ethernet) as a media access control service data unit MSDU, a step 410 of adding a MAC header to the MSDU to generate a data frame, and a step 420 of dividing the data frame having the MAC header into n data frames MAC data-f1, MAC data-f2 and MAC data-f3 (n is 3 in this embodiment). The data frame dividing step in the MAC layer further includes a step 430 of respectively adding cyclic redundancy check (CRC) check bits c1, c2 and c3 to the three data frames MAC data-f1, MAC data-f2 and MAC data-f3 to generate data frames MSDU-f1-c1, MSDU-f2-c2 and MSDU-f3-c3, and a step 440 of defining the data frames MSDU-f1 -c1, MSDU-f2-c2 and MSDU-f3-c3 as three groups MPDU-f1, MPDU-f2 and MPDU-f3.

The data frame dividing process in the physical layer includes a step 450 of defining the data frames received from an upper layer (e.g., the MAC layer), as a physical service data unit (PSDU), and a step 460 of processing the PSDU according to an Institute for Electrical and Electronics Engineers (IEEE) 802.11 standard by performing data processing in the physical layer to generate three payloads payload-f1, payload-f2 and payload-f3. The data frame dividing process in the physical layer further includes a step 470 of adding a preamble and a header to the second and third payloads payload-f2 and payload-f3 to generate three sub payload groups Sub-payload-f1, preamble-header-Sub-payload-f2 and preamble-header-Sub-payload-f3, and a step 480 of adding a preamble and a header to the three sub payload groups to generate a physical layer data frame. In this embodiment, when the data frame received from the upper layer is 1000 oct, the data frames the MAC layer can receive is 3000 oct.

Figure 5:
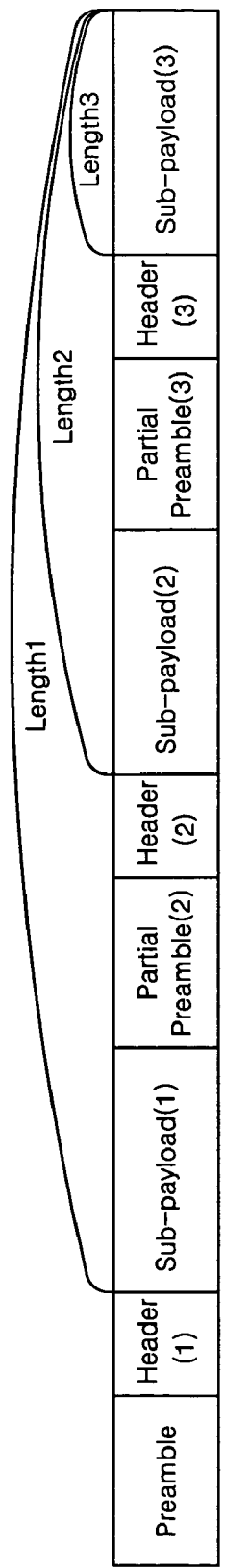
FIG. 5 shows a physical layer data frame generated by the method of dividing a payload intra-frame shown in FIG. 4.

FIG. 5 shows the physical layer data frame generated by the method of dividing a payload intra-frame as shown in FIG. 4. Referring to FIG. 5, the physical layer data frame is composed of a preamble, a header(1), a sub-payload(1), a partial preamble(2), a header(2), a sub-payload(2), a partial preamble(3), a header(3) and a sub-payload(3). The preamble, partial preamble(2) and partial preamble(3) are composed of specific patterns arranged between a receiver and a transmitter. The receiver monitors the frame using a current channel, detects the head of the frame when the frame has been detected, synchronizes with the transmitter, and presumes the effect of channel distortion on a received signal using the preamble, partial preamble(2) and partial preamble(3).

The header in the physical layer generally contains information about a length of a payload having data and its transmission rate. The header(1) includes information regarding a length Length1 of the data stream following the header(1), and the header(2) contains information regarding a length Length2 of the data stream following the header(2). The header(3) includes information regarding a length Length3 of the data stream following the header(3).

To apply the payload intra-frame dividing method of the present invention to systems that process data according to international standards such as the IEEE 802.11 standard, the following takes place. While data communication is carried out between two systems that support the present invention, one system can decode the header of the physical layer to confirm the frame length of the physical layer. When the systems are operated in such a mode, they must agree on the mode because the payload of the physical layer frame according to the present invention includes the preamble as well as the data. To achieve this, the systems can be informed of the mode using a portion of the data bits (e.g., 9 bits) that are not used by the header of the physical layer frame. In doing so, the payload intra-frame dividing method of the present invention can be applied to conventional systems that process data according to the international standards such as the IEEE 802.11 standard without generating, for example, errors in the physical layer.

To transmit and receive the data frames divided by the payload intra-frame dividing method of the present invention, the present invention proposes an acknowledge (ACK) frame to compensate for defects of a conventional ACK frame. The conventional ACK frame includes information about one payload in the physical layer data frame. However, the physical layer data frame according to the present invention has multiple divided payloads. Thus, an ACK frame is provided in accordance with the present invention to transmit information about the physical layer data frame including the multiple payloads.

In a case where an error is generated, for example, in the middle payload among the plurality of divided payloads, the deterioration of throughput due to data re-transmission can be minimized only when payloads having no error are normally processed and a signal, which requests only the payload having an error to be re-transmitted, is sent to a corresponding transmitter.

Figure 6:
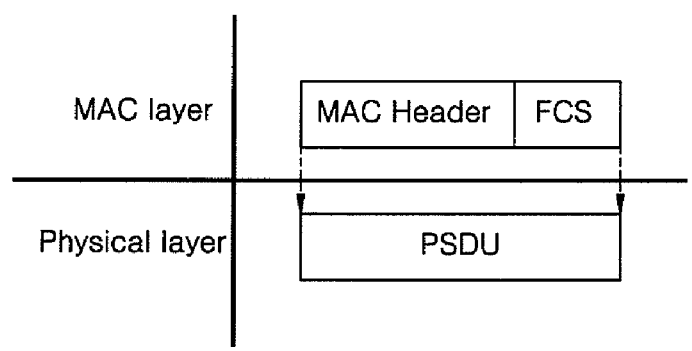
FIG. 6 shows a conventional acknowledge (ACK) frame.

FIG. 6 shows the conventional ACK frame. Referring to FIG. 6, the conventional ACK frame of the MAC layer is composed of the MAC header and a frame check sequence (FCS) and acknowledges the entire physical layer frame.

Figure 7:
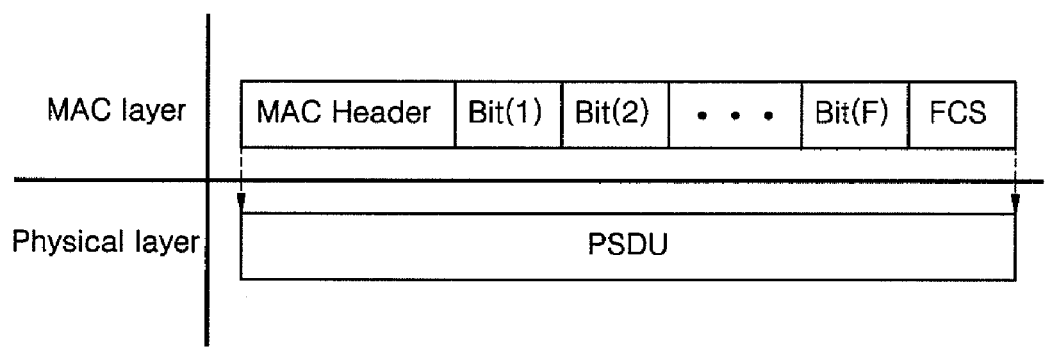
FIG. 7 shows an ACK frame used in the method of dividing a payload intra-frame according to an exemplary embodiment of the present invention.

FIG. 7 shows the ACK frame used in the frame dividing method according to the present invention. Referring to FIG. 7, the ACK frame includes a plurality of information bits Bit(1), Bit(2) . . . Bit(3) that respectively represent whether the divided data frames have a transmission error in addition to the MAC header and FCS. The receiver transmits the ACK frame to the transmitter. The transmitter recognizes information about a portion having an error from the ACK frame and re-transmits only data corresponding to the portion having the error to the receiver. Accordingly, when information about MAC frame fragmentation provided by the IEEE 802.11 standard is installed in the MAC header the data frame dividing method of the present invention can detect an error therein and re-transmit data corresponding to the error back to the receiver.

While the data dividing method of the present invention is applied to the Ethernet frame in the above-described exemplary embodiment, it can be also applied to data frames longer than the Ethernet data frame, such as infinite data, which includes multimedia data or broadcasting data types. In this case, the infinite data is divided into data frames having a predetermined length and transmitted as a single physical layer data frame.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of dividing a payload intra-frame for improving throughput of a wireless local area network (LAN) that includes a media access control (MAC) layer, a physical layer and a physical medium, comprising:
   receiving, at the MAC layer, a data frame from an upper layer, adding a MAC layer header to the data frame, dividing the data frame with the MAC layer header into a plurality of data frames and adding a cyclic redundancy check (CRC) bit to each of the divided data frames; and
   generating, at the physical layer, a physical layer data frame by using the divided data frames with the CRC bits received from the MAC layer;
   wherein a total length of the divided data frames with the CRC bits received from the MAC layer during a single transmission is within a range of a maximum data frame length that the physical layer can transmit during a single transmission.

2. The method of dividing a payload intra-frame as claimed in claim 1, wherein
   the physical layer data frame generating step comprises:
   receiving, at the physical layer, the divided data frames with the CRC bits from the MAC layer and processing the data frames using an Institute for Electrical and Electronics Engineers (IEEE) 802.11 standard to generate a corresponding number of sub payloads;
   adding a partial preamble and a physical layer header to each of the sub payloads other than a first sub payload to generate a payload; and
   generating the physical layer data frame by adding a preamble and a header to the generated payload.

3. The method of dividing a payload intra-frame as claimed in claim 2, wherein the physical layer data frame includes a plurality of sub physical layer frame groups each of which is composed of a preamble, a header and a payload, wherein the a first header in the sub physical layer frame groups comprises a length of data frames following the first header, a second header comprises a length of data frames following the second header, and a third header comprises a length of data frames following the third header.

4. The method of dividing a payload intra-frame as claimed in claim 1, wherein a number of the plurality of data frames is determined by dividing a length of a data frame that the MAC layer can receive during a single transmission by a length of the data frame received from the upper layer during a single transmission.

5. The method of dividing a payload intra-frame as claimed in claim 1, further comprising:
   transmitting the physical layer data frame from a transmitter to a receiver; and
   sending an ACK frame to the transmitter from the receiver that received the physical layer data frame, the physical layer data frame being divided into a plurality of sub payloads and the ACK frame including data that identifies a sub-payload in which an error occurred while the physical layer data frame was transmitted.

6. The method of dividing a payload intra-frame as claimed in claim 5, wherein a number of the plurality of sub payloads is equivalent to a number of the plurality of data frames.

7. A method of dividing a payload intra-frame, comprising:
   adding, at a media access control (MAC) layer, a MAC layer header to a data frame received from an upper layer, dividing the data frame with the MAC layer header into a plurality of data frames and adding a cyclic redundancy check (CRC) bit to each of the divided data frames; and
   generating, at a physical layer, a physical layer data frame by using the divided data frames with the CRC bits received from the MAC layer,
   wherein a total length of the divided data frames with the CRC bits received from the MAC layer during a single transmission is within a range of a maximum data frame length that the physical layer can transmit during a single transmission.

8. The method of dividing a payload intra-frame as claimed in claim 7, wherein the MAC layer, the physical layer and a physical medium form a wireless local area network (LAN) through which the data frame received from the upper layer and the physical layer data frame propagate.

9. A method of dividing a payload intra-frame to generate a physical layer data frame, comprising:
   (a) defining, at a second upper layer, a first data frame received from a first upper layer as a media access control service data unit (MSDU);
   (b) adding a media access control (MAC) header to the MSDU to generate a second data frame;
   (c) dividing the second data frame into a plurality of second data frames;

(d) adding a cyclic redundancy check (CRC) bit to each of the plurality of second data frames;
(e) defining the plurality of second data frames including the CRC bits as a plurality of second groups;
(f) defining the plurality of second groups received from the second upper layer as a plurality of physical service data units (PSDUs);
(g) processing the plurality of PSDUs to generate a plurality of payloads corresponding to the plurality of PSDUs;
(h) adding a first preamble, and a first header to each of the plurality of payloads corresponding to the plurality of PSDUs except a first payload of the plurality of payloads corresponding to the plurality of PSDUs to generate a plurality of sub-payload groups; and
(i) adding a second preamble and a second header to the plurality of sub-payload groups to generate a physical layer data frame.

10. The method of dividing a payload intra-frame as claimed in claim 9, wherein (a-e) take place in a MAC layer.

11. The method of dividing a payload intra-frame as claimed in claim 9, wherein (f-i) take place in a physical layer.

12. The method of dividing a payload intra-frame as claimed in claim 9, wherein the first upper layer is an Ethernet layer.

13. The method of dividing a payload intra-frame as claimed in claim 9, wherein the second upper layer is a MAC layer.

14. The method of dividing a payload intra-frame as claimed in claim 9, wherein (g) uses an Institute for Electrical and Electronics Engineers (IEEE) 802.11 standard for processing the plurality of PSDUs to generate a plurality of payloads corresponding to the plurality of PSDUs.

15. The method of dividing a payload intra-frame as claimed in claim 9, wherein the physical layer data frame is transmitted through a wireless local area network (LAN).

16. The method of dividing a payload intra-frame as claimed in claim 15, wherein the wireless LAN is a carrier sensing multiple access/collision avoidance (CSMA/CA) LAN.

* * * * *